US010549219B2

(12) United States Patent
McLean

(10) Patent No.: US 10,549,219 B2
(45) Date of Patent: Feb. 4, 2020

(54) APPARATUS, SYSTEM AND/OR METHOD FOR MODULAR FILTER SCREENS

(71) Applicant: M-I DRILLING FLUIDS UK LTD., Westhill (GB)

(72) Inventor: Claire Rosaleen McLean, Westhill (GB)

(73) Assignee: M-I Drilling Fluids UK Ltd., Aberdeen (GB)

( * ) Notice: Subject to any disclaimer, the term of this patent is extended or adjusted under 35 U.S.C. 154(b) by 634 days.

(21) Appl. No.: 14/892,964

(22) PCT Filed: Jul. 23, 2014

(86) PCT No.: PCT/US2014/047815
§ 371 (c)(1),
(2) Date: Nov. 20, 2015

(87) PCT Pub. No.: WO2015/013405
PCT Pub. Date: Jan. 29, 2015

(65) Prior Publication Data
US 2016/0107107 A1 Apr. 21, 2016

Related U.S. Application Data

(60) Provisional application No. 61/858,538, filed on Jul. 25, 2013.

(51) Int. Cl.
*B01D 29/05* (2006.01)
*E21B 21/06* (2006.01)
(Continued)

(52) U.S. Cl.
CPC ........... *B01D 29/05* (2013.01); *B01D 29/012* (2013.01); *B01D 29/52* (2013.01); *B01D 29/56* (2013.01); *B07B 1/4645* (2013.01); *E21B 21/065* (2013.01)

(58) Field of Classification Search
CPC .. B01D 33/0376; B01D 33/54; B01D 29/445; B01D 29/46; B01D 29/72; B01D 29/05;
(Continued)

(56) References Cited

U.S. PATENT DOCUMENTS 5,137,622 A * 8/1992 Souter ................... B01D 29/01
209/403
5,950,841 A * 9/1999 Knox .................... B07B 1/4663
209/315

(Continued)

FOREIGN PATENT DOCUMENTS

| CN | 2764926 Y | 3/2006 |
| CN | 202228025 U | 5/2012 |
| GB | 2203061 A | 10/1988 |
| GB | 2245191 A | 1/1992 |

OTHER PUBLICATIONS

International Search Report and Written Opinion dated Nov. 11, 2014, issued by the Korean Intellectual Property Office in related International Application No. PCT/US2014/047815 (10 pages).
Examination Report for the equivalent U.K. patent application 1601560.4 dated Sep. 16, 2019.

*Primary Examiner* — David C Mellon
(74) *Attorney, Agent, or Firm* — Jeffrey D. Frantz

(57) ABSTRACT

A method and/or a system filters particles using a screen with modular segments installed into a frame. The frame has a perimeter structure and an orthogonal array of support members. The segments have a segment perimeter frame, an orthogonal array of ribs and a mesh stretched across the segment. When the mesh of the segments is damaged, the damaged segment is removed from the frame and a replacement segment is installed.

12 Claims, 6 Drawing Sheets

(51) Int. Cl.
*B07B 1/46* (2006.01)
*B01D 29/01* (2006.01)
*B01D 29/52* (2006.01)
*B01D 29/56* (2006.01)

(58) Field of Classification Search
CPC .... B01D 2201/4023; B01D 2201/4038; B01D 2201/0415; B01D 2201/188; B01D 35/20; B01D 29/012; B01D 29/52; B01D 29/56; B01D 33/061; B01D 33/0353; B01D 33/0346; B01D 2201/0423; B07B 1/4645; B07B 1/4609; B07B 1/46; B07B 1/4627; B07B 1/04; B07B 1/4618; B07B 1/4654; B07B 2201/02; B07B 2201/04; E21B 21/065
See application file for complete search history.

(56) References Cited

U.S. PATENT DOCUMENTS

| | | | |
|---|---|---|---|
| 6,267,246 B1 * | 7/2001 | Russell | B07B 1/4618 209/399 |
| 8,118,175 B2 * | 2/2012 | Davis | B01D 33/0093 210/321.77 |
| 2001/0047871 A1 | 12/2001 | Johnson et al. | |
| 2008/0035330 A1 | 2/2008 | Richards | |
| 2010/0269468 A1 | 10/2010 | Crabtree et al. | |
| 2011/0094950 A1 * | 4/2011 | Dahl | B07B 1/4618 210/85 |

* cited by examiner

APPARATUS, SYSTEM AND/OR METHOD FOR MODULAR FILTER SCREENS

CROSS-REFERENCE TO RELATED APPLICATIONS

This application claims the benefit of U.S. Provisional Patent Application No. 61/858,538, filed Jul. 25, 2013, the disclosure of which is incorporated herein by reference.

BACKGROUND

The embodiments disclosed herein related to an apparatus, a system and/or a method for filtering and/or separating particles. More specifically, embodiments disclosed herein relate to modular filter screens and methods using modular filter screens.

Filter screens are used to filter particles in industrial filtration systems. For example, shale shakers use filter screens to separate drill cuttings from drilling fluid in on-shore and off-shore oilfield drilling. The filters screens have a wire mesh stretched across a frame. The frame is a rectangular grid of support ribs that divide the frame into an orthogonal array of cells. The mesh is secured to the ribs as well as to the surrounding frame. Additionally, the cells in the frame have the same orientation.

The wire mesh has different mesh sizes defined by the size of the apertures between the individual wires in the mesh. The size of the apertures of the mesh is selected depending on the size of the particle to be filtered. Particles smaller than the aperture pass through the wire mesh and through the cells between the ribs. The remaining particles are discharged on an end of the filter screen.

Over the life of the filter screen, particle movement through the wire mesh, as described here, may cause wear on the wire mesh. Eventually, holes form in the wire mesh that allow larger particles to pass through the screen. Certain regions of the mesh are more prone to damage than other regions. For example, the mesh stretched across cells below where the particles are introduced experience greater wear than the mesh stretched across cells towards the exit end of the screen.

Conventional filter screens may be heavy and cumbersome to transport. Additionally, the filter screens are bulky. Locations with limited space, such as drilling rigs, may not be able to store extra filter screens. Therefore, replacement filter screens are not always available.

To extend the operational life of the screen, plugs are used to block particles from going through damaged wire mesh. These plugs fit into the cells and have a solid surface oriented towards the damaged mesh. The plugs fit into the cell from below and are hammered into place. As such, the plugs are designed to block particles from traveling through the damaged screen and the cell. Therefore, the cells with the plugs no longer filter particles.

As more of the plugs are installed into more of the cells, the filtering ability of the filter screen is reduced. Eventually, the filter screen must be replaced. Moreover, the plugs cannot be reused as they are hammered in place without a way to remove them. When the filter screen is discarded, the installed plugs are also discarded.

Further, incorporating a design into the filter screen that allows plugs to snap into the cells increases development time and cost. Additionally, retrofitting a system so that plugs may be used to patch a hole in the mesh requires time and significant retooling.

DETAILED DESCRIPTION

The embodiments disclosed herein related to an apparatus, a system and/or a method for filtering and/or separating particles. More specifically, embodiments disclosed herein relate to modular filter screens and methods using modular filter screens.

Figure 1:
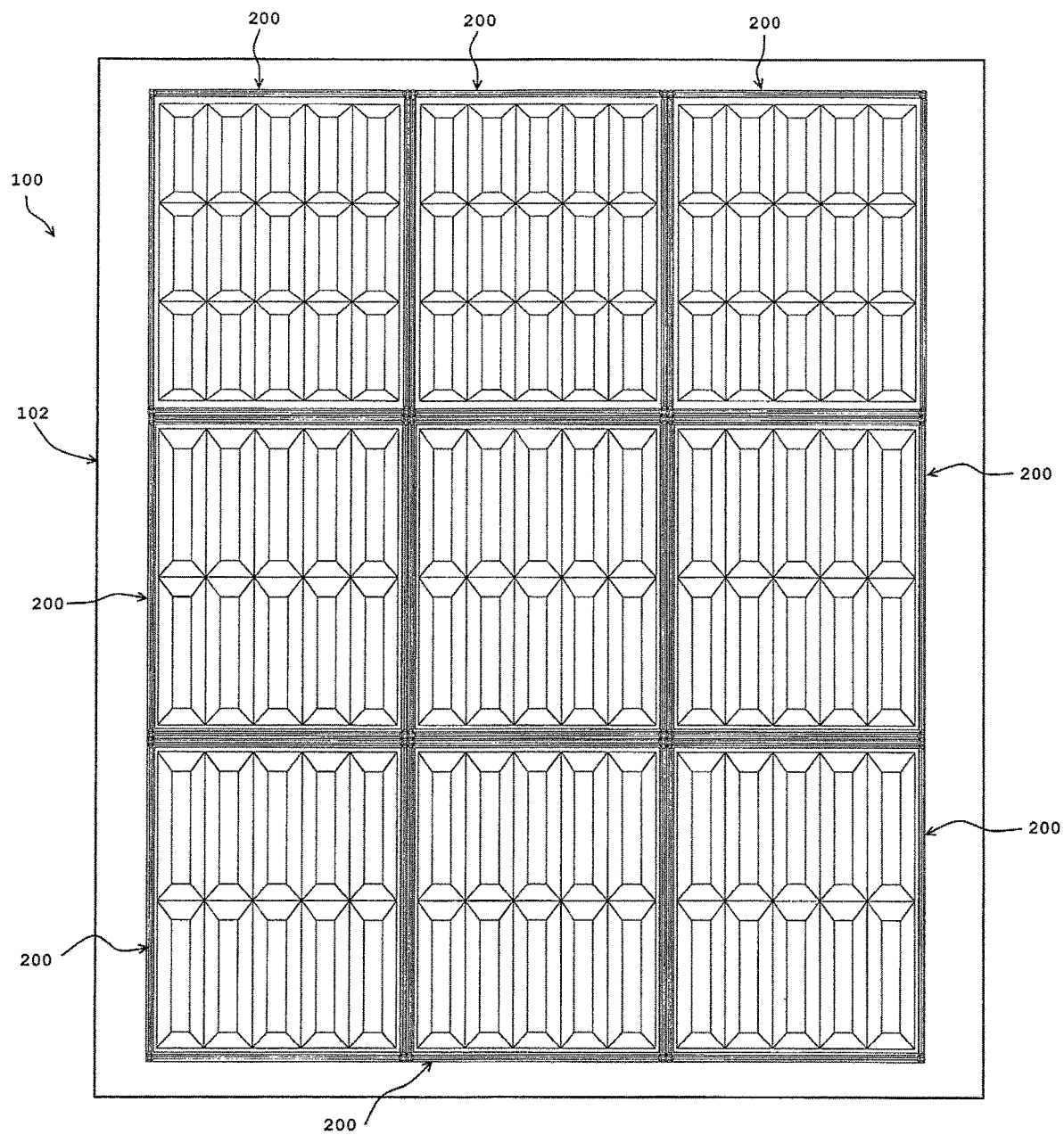
FIG. 1 illustrates a top view of an embodiment of a filter screen.
Figure 2:
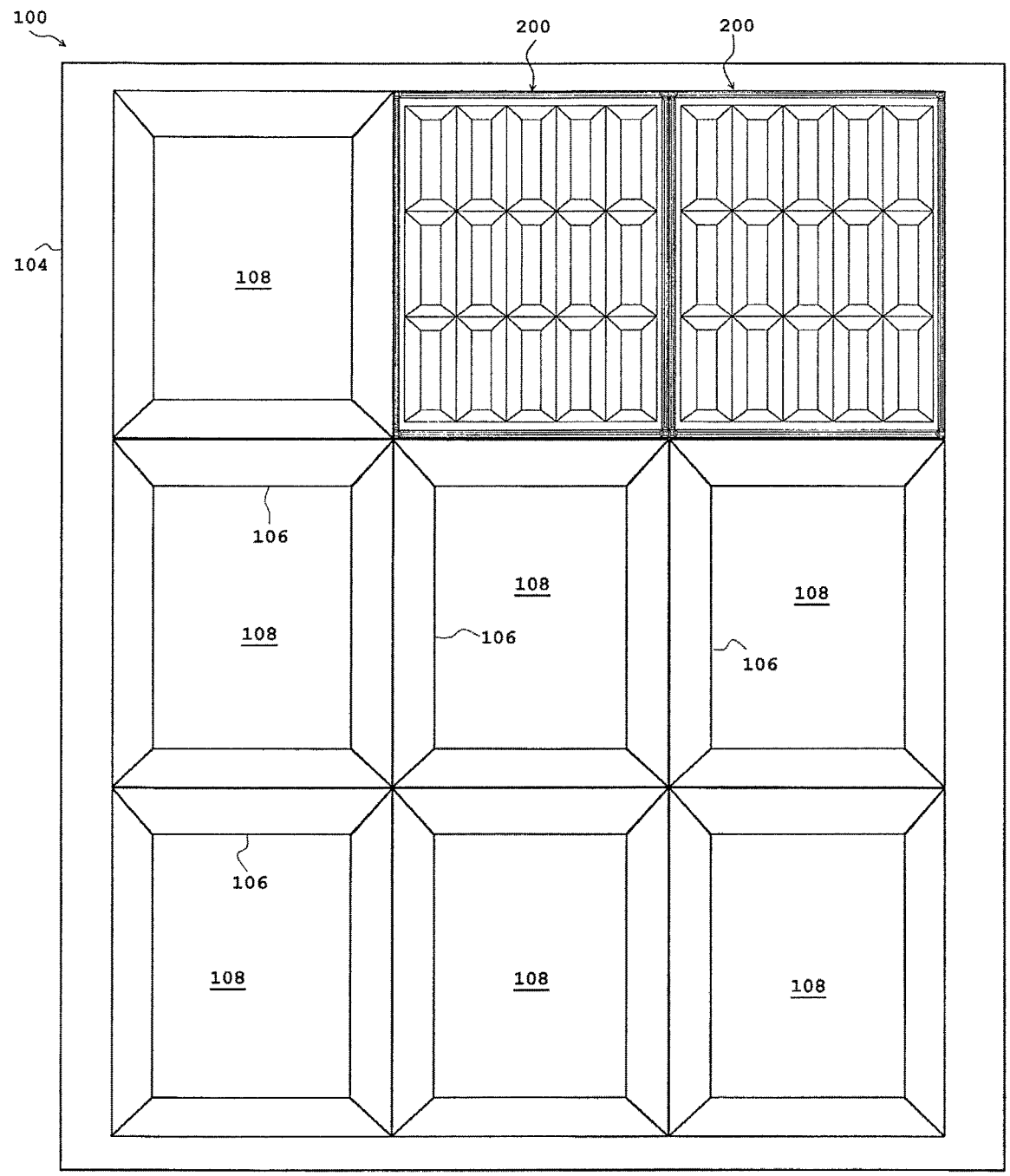
FIG. 2 illustrates a top view of an embodiment of a filter screen partially populated with segments.

FIG. 1 illustrates an embodiment of a screen 100. The screen 100 may have a frame 102 and a plurality of segments 200. FIG. 2 illustrates the screen 100 with the frame 102. The frame 102 is only partially populated with the segments 200. The screen 100 may have an input side 128 and an output side 130. The input side 128 of the screen 100 may receive a material to be separated. A portion of the material may filter through the screen 100 and may be deposited in a sump, a reservoir, a hopper and/or a collection pan. A portion of the material not filtered through the screen 100 may be discharged from the output side 130 of the screen 100 and may be deposited into a shaker pit and/or other container. In an embodiment, the material to be separated may be a slurry of drilling fluid and drill cuttings. However, the screen 100 is not limited to separating solids from a liquid. The screen 100 may also separate solids of different sizes.

Figure 3:
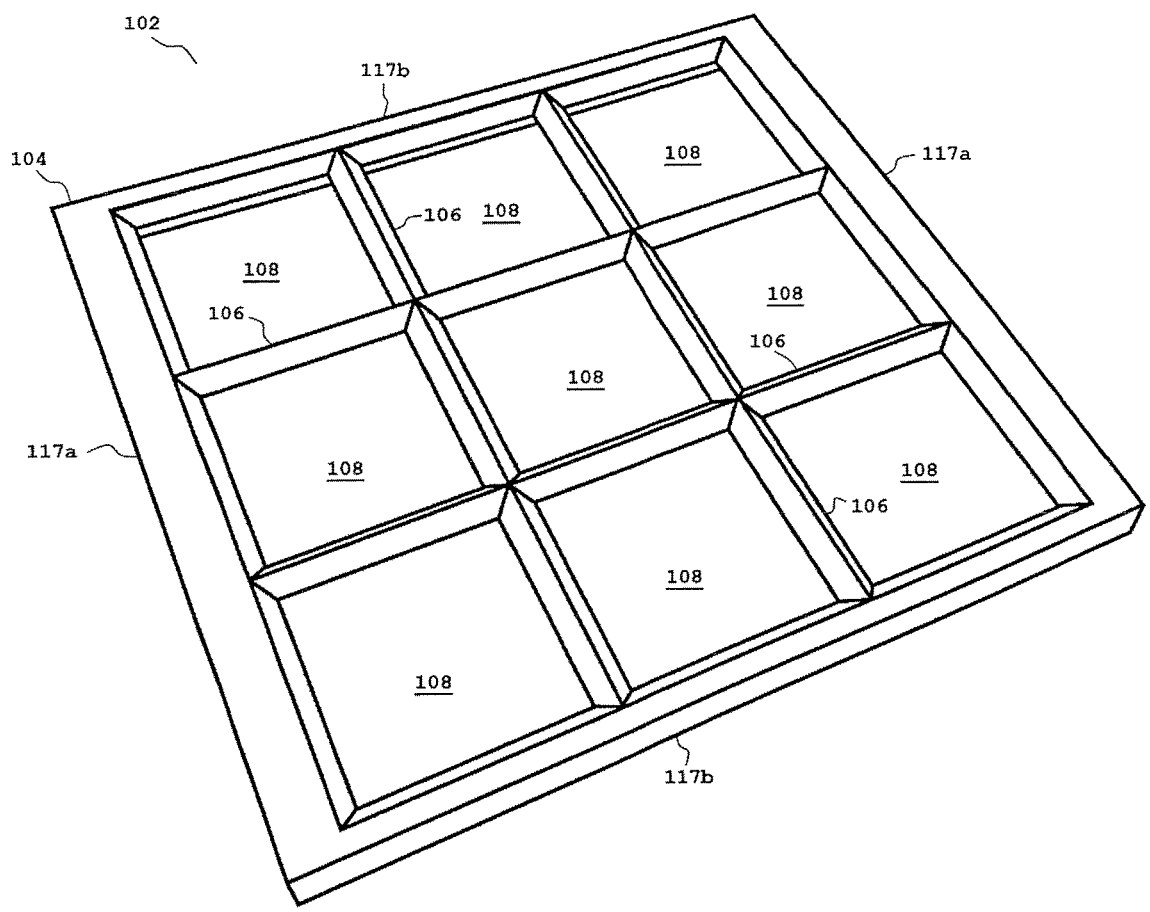
FIG. 3 illustrates an isometric view of an embodiment of a frame for the filter screen.
Figure 4:
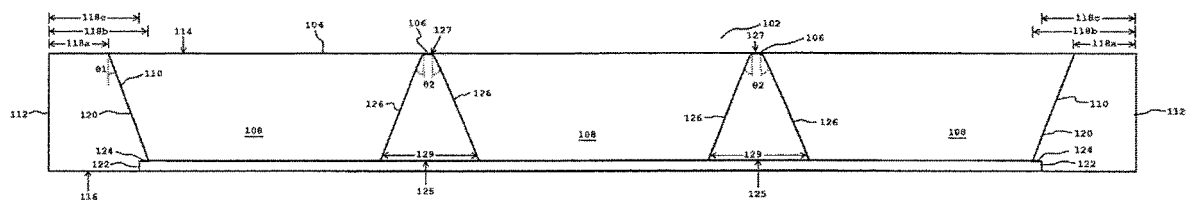
FIG. 4 illustrates a side cutout view of an embodiment of the frame.

FIGS. 3 and 4 illustrate an embodiment of the frame 102. As shown, the frame 102 may have a perimeter structure 104 and an orthogonal array of support members 106. The perimeter structure 104 and the array of support members 106 may divide the frame 102 into a plurality of regions 108. FIG. 3 illustrates an embodiment of the frame 102 with nine regions 108. The frame 102 may have any number of regions 108 by changing the size of the perimeter structure 104 and/or changing the number of support members 106.

The perimeter structure 104 may have an inner wall 110, an outer wall 112, a top 114, a bottom 116 and a thickness 118. The inner wall may have a tapered portion 120, a flat portion 122 and a lip 124. The tapered portion 120 of the inner wall 110 may taper downwardly toward the center of the perimeter structure 104 at an angle 132. The top 114 of the perimeter structure 104 may have a top thickness 118a. As the tapered portion 120 of the inner wall 110 tapers downwardly, the thickness 118 of the perimeter structure 104 may increase until the thickness 118 equals an intermediate thickness 118b. The flat portion of the inner wall may have a uniform bottom thickness 118c. The intermediate thickness 118b may be greater than the top thickness 118a. The intermediate thickness 118b may be greater than the bottom thickness 118c. The lip 124 may form at an interface 123 between the tapered portion 120 and the flat portion 122 of the inner wall 110.

The outer wall 112 of the perimeter structure 104 may be flat. The perimeter structure 104 may be rectangular with secure sides 117a and support sides 117b. The top thickness 118a, the intermediate thickness 118b and the bottom thickness 118c of the secure sides 117a may be greater than the top thickness 118a, the intermediate thickness 118b and the bottom thickness 118c respectively of the support sides 117b. In an embodiment, the secure sides 117a may be longer than the support sides 117b. The perimeter structure 104 may be configured to fit in a shaker (not shown) and may be secured into place along the secure sides 117a. In an embodiment, the top thickness 118a, the intermediate thickness 118b and the bottom thickness 118c of the secure sides 117a may be equal to the top thickness 118a, the intermediate thickness 118b and the bottom thickness 118c respectively of the support sides 117b. In an embodiment, the perimeter structure 104 may be secured along the secure sides 117a and the support sides 117b. The perimeter structure 104 may be secured into a filtration system (not shown) by a wedge, clamp or any other means known to a person of ordinary skill in the art. In an embodiment, the screen 100 may be secured in a basket (not shown) of the filtration system via the perimeter structure 104.

The support members 106 may have a bottom 125, sides 126 and a top 127. The sides 126 of each of the support members 106 may join at the top 127 of the support member 106 and may taper outwardly and downwardly at the angle 134. The angle 134 of the sides 126 of the support members 105 may equal the angle 132 of the tapered portion 120 of the inner wall 110 of the perimeter structure 104. Each of the support members 106 may have a thickness 129 at the bottom of each of the support members 106. The support members 106 may interface with the tapered portion 120 of the inner wall 110 of the perimeter structure 104 to form the plurality of regions 108. The lip 124 of the inner wall 110 of the perimeter structure 104 may be coplanar with the bottom 125 of the support members 106.

The regions 108 may have rectangular cross-sections. As the tapered portion 120 of the inner wall 110 of the perimeter structure 104 and the sides 126 of the support members 106 taper downwardly, the cross-sections of the plurality of regions 108 may decrease in size.

Figure 5A:
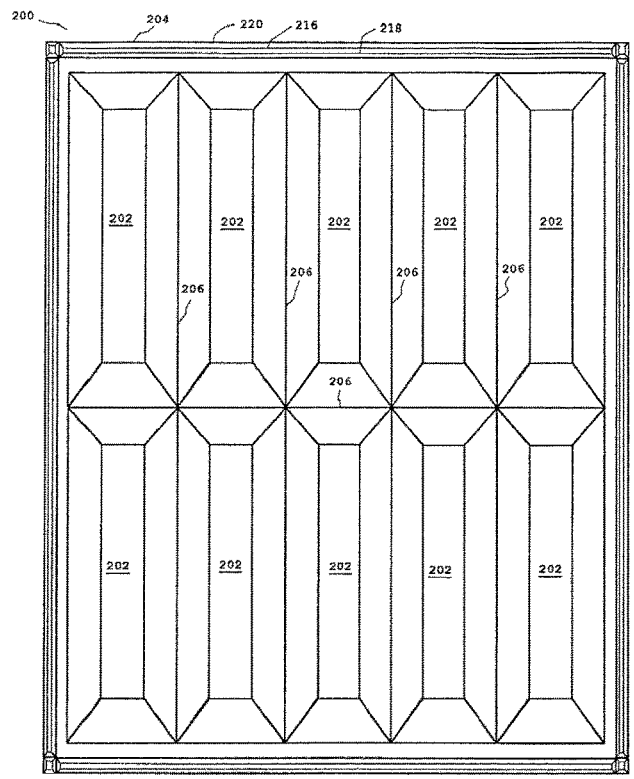
FIG. 5A illustrates a top view of an embodiment of one segment.
Figure 5B:
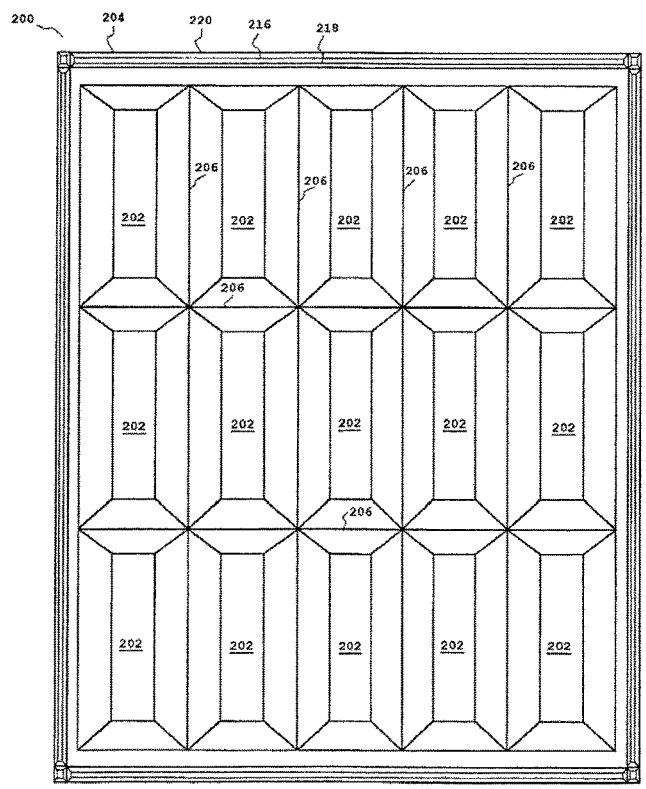
FIG. 5B illustrates a top view of an additional embodiment of one segment.

FIG. 5A illustrates an embodiment of one of the plurality of segments 200. Each of the segments 200 may be divided into a plurality of cells 202 by a segment perimeter frame 204 and an orthogonal array of ribs 206. FIG. 5A shows the segments 200 with ten cells 202. However, the segment 200 may have more cells 202 or less cells 202 as required by an embodiment of the segment 200. The segments 200 may have any number of the cells 202 by changing the number of the ribs 206. For example, in an embodiment illustrated in FIG. 5B, the segments 200 may have fifteen cells 202.

Figure 6:
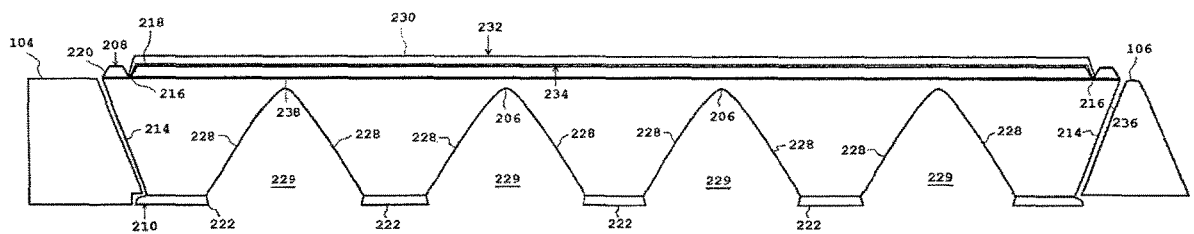
FIG. 6 illustrates a side cutout view of an embodiment of one segment.

The segment perimeter frame 204 may have an outer wall 214, a top 208 and a bottom 210. The top 208 of the segment perimeter frame 204 may have a groove 216 defining an inner perimeter 218 and an outer perimeter 220. As shown in FIG. 6, the segment perimeter frame 204 may have a flange 222 extending outwardly from the outer wall 212 at the bottom 210 of the segment 200. The outer wall 212 may taper inwardly from the top 208 of the segment 200 to the bottom 210 of the segment 200 at an angle 236. The angle 236 of the outer wall 214 may equal the angle 132 of the tapered portion 120 of the inner wall 110 of the perimeter structure 104 and the sides 126 of the support members 106.

Each of the cells 202 may have walls 228 defined by the segment perimeter frame 204 and the orthogonal array of ribs 206. The walls 228 of the cells 202 may taper downwardly and inwardly at the angle 238 towards the center of each of the cells 202. Each of the cells 202 may have a rectangular cross-section. As the walls 228 of each of the cells 202 taper downwardly and inwardly, the cross-section of each of the cells 202 may be smaller at the bottom 210 of the cell 202 compared to the top 208 of the cell 202.

Each of the ribs 206 may define a cross-sectional area. In an embodiment, the cross-sectional area of each of the ribs 206 may be a triangle. Additionally, each of the ribs 206 may be hollow. Alternatively, in an embodiment, the cross-section of each of the ribs 206 may be an inverted V with a space 229 between the walls 228 of the cells 202. The outer wall 212 of the segment perimeter frame 204 may be configured to expose the space 229 between the walls 228 of the cells 202.

As shown in FIG. 6, a mesh 230 may be stretched across the inner perimeter 218 of the segment perimeter frame 204 and may be secured to the groove 216. The mesh 230 may have a top-side 232 and an underside 234. The underside 234 of the mesh 230 may be supported by the inner perimeter 218 of the segment perimeter frame 204 and the top 208 of the orthogonal array of ribs 206. The mesh 230 may be a single layer of woven mesh wire or multiple layers of woven mesh wire. The mesh 230 may have a mesh size to filter particles for an embodiment. For example, the mesh 230 may have the mesh size to separate drill cuttings from circulated drill fluid. The mesh size as used herein refers to the size of the apertures in the mesh 230.

The segments 200 may have different configurations. Between the different configurations, the segments 200 may have cells 202 with different sizes and/or may have mesh 230 with different mesh sizes. For example, the segments 200 that may be installed into the frame 102 in areas of heavy wear, such as the segments 200 closer to the input 128 of the screen 100, may have smaller sized cells 202 compared to segments 200 closer to the output 130 of the screen 100. The screens 100 with smaller cells 202a may be more durable compared to screens 100 with larger cells 202b. The segment perimeter frame 204 and/or the orthogonal array of ribs 206 may have a color. Different configurations of the segments 200 may have the segment perimeter frame 204 and/or the orthogonal array of ribs 206 of different colors.

The segments 200 may be installed into the frame 102. One of the segments 200 may be inserted into one of the regions 108 so that the segment 200 fits within the geometry of the region 108. The flange 222 of the segment 200 that may be installed may flex during insertion into one of the regions 108 of the frame 102. The flange 222 may interface with the lip 124 of the perimeter structure 104 and the bottom 125 of the array of support members 106 to lock the segment 200 installed into the region 108.

FIG. 1 shows an embodiment of the screen 100 with the segments 200 installed into the regions 108 of the frame 102. Additionally, FIG. 1 shows a screen 100 with the segments 200 having different configurations. In FIG. 1, the segments 200 adjacent to the input side 128 of the screen 100 may be configured as the segments 200 shown in FIG. 5A. The remaining segments 200 are configured as the segments 200 shown in FIG. 5B. However, the configuration of the segments 200 installed into the frame 102 may be different than the configuration shown in FIG. 1. The segments 200 may be installed by hand or with a tool, such as a hammer or a rubber mallet.

Each of the segments 200 may have an orientation with respect to the alignment of the cells 202. FIG. 1 shows an embodiment where the segments 200 have the same orientation. However, some of the segments 200 may have different orientations as installed. In an embodiment, some of the segments 200 may be rotated 90 degrees with respect to the rest of the segments 200.

The frame 102 may be designed to be durable so that the frame 102 may be used during the operational life of a shale shaker. Conversely, the segments 200 may be designed to be disposable. When the mesh 230 on one of the segments 200 is damaged, the segment 200 may be replaced and may be discarded, recycled and/or refurbished.

When designing the screen 100 for a particular application, the segments 200 installed into the frame 102 may be chosen from segments 200 with different configurations. The screen 100 may be shipped to a location with the segments 200 separate from the frame 102. To facilitate repair, the replacement segments 200 may also be shipped to the location. The segments 200 may be installed into the frame 102 and the screen 100 may be installed into the filtration system.

After the screen 100 is installed, the filtration system may be operated. The segments 200 adjacent to the input side 128 of the screen 100 may become damaged more frequently than the other segments 200 in the screen 100. When the mesh 230 of one or more of the segments 200 is damaged, the operation of the filtration system may be halted. The screen 100 may be removed from the filtration system. The segment 200 with the damaged mesh 230 may be removed by pushing the bottom 210 of the segment 200 until the flange 222 of the segment 200 disengages from the lip 124 of the inner wall 110 of the perimeter structure 104 and the bottom 125 of the orthogonal array of support members 106. The removed segment 200 may be discarded, recycled and/or refurbished. The removed segment 200 may be replaced and the screen 100 may then be reinstalled into the filtration system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the present disclosure should be limited only by the attached claims.

The invention claimed is:

1. A system comprising:
   a frame with a perimeter structure defining a periphery of the frame, wherein the perimeter structure has a total height defined between a first end of the perimeter structure and an opposite second end of the perimeter structure, an inner wall extending the total height of the perimeter structure and a lip extending from the inner wall at the opposite second end of the perimeter structure, wherein the frame has a plurality of regions defined by support members within the perimeter structure and each support member has a total height defined between a first edge of each support member and an opposite second edge of each support member, and further wherein the lip extending from the inner wall at the opposite second end of the perimeter structure is adjacent to the opposite second edge of each support member; and
   a plurality of segments respectively inserted into the plurality of regions wherein each segment of the plurality of segments has a flange interfacing with at least one selected from the lip of the perimeter structure and the second opposite edge of at least one support member to secure the segment in the region,
   wherein sides of each support member taper outwardly from the first edge of each support member to the opposite second edge of each support member, and further wherein the sides of each support member have an outer surface that is flat and planar extending the total height of each support member from the first edge of each support member to the opposite second edge of each support member.

2. The system of claim 1, wherein each segment of the plurality of segments includes a segment perimeter frame defining a periphery of the segment.

3. The system of claim 1, wherein each segment of the plurality of segments includes segment ribs extending lengthwise across the segment.

4. The system of claim 1, wherein each segment of the plurality of segments includes cells formed by arranging segment ribs in the segment.

5. The system of claim 1, wherein each segment has a height with a triangular cross-sectional area.

6. The system of claim 1, wherein each segment of the plurality of segments includes a hollow segment rib extending lengthwise across the segment.

7. The system of claim 1, further comprising:
   a mesh covering a cell formed in the plurality of segments.

8. The system of claim 1, further comprising:
   a plurality of meshes covering a plurality of cells formed in the plurality of segments wherein a mesh from the plurality of meshes has a different density than another mesh from the plurality of meshes.

9. The system of claim 1, wherein each segment of the plurality of segments includes a segment perimeter frame defining a periphery of the segment, and the system further comprises a mesh attached to at least one of the segment perimeter frames.

10. The system of claim 1, wherein the inner wall of the perimeter structure includes a tapered section, wherein the support members engage with the tapered section to form at least one region of the plurality of regions.

11. The system of claim 1, wherein the lip is coplanar with the support members.

12. The system of claim 1, wherein each segment is color-coded.

* * * * *